(12) United States Patent
Ogata et al.

(10) Patent No.: US 6,238,631 B1
(45) Date of Patent: May 29, 2001

(54) THREE-DIMENSIONAL, PHOTOCATALYTIC FILTER APPARATUS

(75) Inventors: Shiro Ogata, Kanagawa-ken; Kazuhiko Sonomoto, Saitama-ken, both of (JP)

(73) Assignee: TAO Inc., Tokyo (JP)

( * ) Notice: Subject to any disclaimer, the term of this patent is extended or adjusted under 35 U.S.C. 154(b) by 0 days.

(21) Appl. No.: 09/399,185

(22) Filed: Sep. 20, 1999

(30) Foreign Application Priority Data

Sep. 18, 1998 (JP) .................................................. 10-264567
Apr. 16, 1999 (JP) .................................................. 11-109143

(51) Int. Cl.$^7$ .................................................. B01J 19/12
(52) U.S. Cl. .................................................. 422/186.3
(58) Field of Search .................................. 422/186, 186.3

(56) References Cited

U.S. PATENT DOCUMENTS

| | | | |
|---|---|---|---|
| 4,888,101 | * 12/1989 | Cooper | 422/186.3 |
| 4,891,712 | * 1/1990 | Robertson et al. | 422/186.3 |
| 5,069,885 | 12/1991 | Ritchie . | |
| 5,516,492 | * 5/1996 | Dong et al. | 422/186.3 |
| 5,689,798 | * 11/1997 | Oeste | 422/186.3 |
| 6,063,343 | * 5/2000 | Say et al. | 422/186.3 |

FOREIGN PATENT DOCUMENTS

| | | |
|---|---|---|
| 0 826 531 A2 | 3/1998 | (EP) . |
| WO 96/00190 | 1/1996 | (WO) . |
| WO 96/37281 | * 11/1996 | (WO) .......................... B01D/53/86 |
| WO 97/40936 | 11/1997 | (WO) . |

OTHER PUBLICATIONS

09187491 Jul. 22, 1997 Japan Abstract only.
07108138 Apr. 25, 1995 Japan Abstract only.

* cited by examiner

*Primary Examiner*—Kathryn Gorgos
*Assistant Examiner*—Thao Tran
(74) *Attorney, Agent, or Firm*—Sughrue, Mion, Zinn, Macpeak & Seas, PLLC

(57) ABSTRACT

A three-dimensional, photocatalytic filter apparatus is constituted by (a) a flow path means through which a fluid stream containing pollutants passes; (b) a plurality of porous filter plates each carrying a photocatalyst for decomposing the pollutants; (c) a light source; and (d) at least one support member for arranging each porous filter plate in a path of the fluid stream in the flow path means, at such a three-dimensional position that each porous filter plate is inclined relative to both the fluid stream and the light source, to achieve sufficient contact with the pollutants and sufficient exposure to the light source.

7 Claims, 9 Drawing Sheets

THREE-DIMENSIONAL, PHOTOCATALYTIC FILTER APPARATUS

BACKGROUND OF THE INVENTION

The present invention relates to a three-dimensional, photocatalytic filter apparatus for removing organic or inorganic pollutants in a gas or liquid stream by using a semiconductor photocatalyst.

Ever increasing use of petrochemicals has caused serious environmental pollution problems. To solve the pollution problems, proposal has been made to purify a fluid by the photocatalytic oxidative decomposition of pollutants with a semiconductor photocatalyst. For example, an apparatus or instrument having a porous substrate supporting a semiconductor photocatalyst is placed in a flow path of a fluid containing pollutants to decompose the pollutants with the semiconductor photocatalyst.

In this method, to enhance the photocatalytic efficiency, it is needed to increase the photocatalytic surface area and to sufficiently activate the semiconductor photocatalyst with light having a wavelength capable of activating the photocatalyst. Several proposals have been made to increase a photocatalytic surface area to increase the opportunity of contact between pollutants and a semiconductor photocatalyst, and to form a photocatalyst layer with increased photocatalytic surface area. See Japanese Patent Laid-Open Nos. 5-309267, 8-196903, etc.

Well known in the art to increase the photocatalytic surface area is the formation of a photocatalyst layer on a porous substrate having a large surface area such as a layer of bonded fine particles, a nonwoven fabric, glass wool, a spongy substrate, etc. However, when a plurality of porous filter plates are arranged in a filter apparatus, a semiconductor photocatalyst deposited on all the porous substrates cannot be activated, because each porous substrate absorbs or cuts an activating light. If a layer of silica glass powder, soda glass powder or glass wool were used as the porous substrate, the activating light would reach comparatively deeper inside the porous substrate. However, such a porous substrate cannot be formed larger than about 30 mm in diameter due to its poor mechanical strength. Also, to achieve sufficient light-absorbing efficiency, the porous substrate should be as thin as about 2 mm or less. Therefore, this porous substrate is not promising in practical applications.

Some proposals also have been made to improve the shape and arrangement of a photocatalytic filter. For example, Japanese Patent Laid-Open No. 7-108138 discloses a photocatalytic filter apparatus comprising photocatalyst-supporting thin plates arranged in a blind form in a flow path of a fluid. Japanese Patent Laid-Open No. 8-121827 discloses a photocatalytic filter apparatus comprising a photocatalyst-supporting, corrugated nonwoven fabric on both sides of an ultraviolet lamp in a flow path of a fluid. Japanese Patent Laid-Open No. 9-187491 discloses a photocatalytic filter apparatus placed in a flow path of a fluid, the apparatus comprising a plurality of porous substrates each supporting a photocatalyst on both surfaces and radially fixed around a light source. Japanese Patent Laid-Open No. 9-248426 discloses a movable, photocatalytic filter apparatus comprising a photocatalyst layer formed on a convex member for conveying or stirring a fluid, and an ultraviolet source placed inside the convex member.

When a fluid containing pollutants is brought into contact with a semiconductor photocatalyst, active radicals generated by the semiconductor photocatalyst oxidatively decompose pollutants. If the total amount of pollutants exceeds a capacity of the conventional photocatalytic filter apparatuses, the pollutants would not fully come into contact with the photocatalyst, suffering disadvantages that it takes a lot of time to ensure contact of all the pollutants with the photocatalyst. It is difficult to increase a flow rate of the fluid in the conventional photocatalytic filter apparatuses, while enhancing decomposition efficiency. To enhance photocatalytic efficiency, it is necessary to use a suitable activating light that can sufficiently irradiate the semiconductor photocatalyst. Therefore, the development of a photocatalytic filter apparatus capable of efficiently irradiating the semiconductor photocatalyst has been desired.

In addition, intermediate products formed in the oxidative decomposition of nitrogen compounds, sulfur compounds, chlorine compounds, etc. tend to stick to a surface of the semiconductor photocatalyst, making it necessary to remove the intermediate products from the semiconductor photocatalyst at regular intervals. Accordingly, the photocatalytic filter apparatus is required to have a structure capable of being easily cleaned to prevent reducing a decomposition capacity thereof.

OBJECT AND SUMMARY OF THE INVENTION

Accordingly, an object of the present invention is to provide a three-dimensional, photocatalytic filter apparatus having an increased photocatalytic surface area for efficient decomposition of pollutants.

Another object of the present invention is to provide a three-dimensional, photocatalytic filter apparatus ensuring satisfactory irradiation of an activating light to a photocatalytic surface, as well as making good use of scattered light.

As a result of intense research in view of the above objects, the inventors have found the following facts:

(1) When a plurality of porous filter plates are three-dimensionally assembled such that each filter plate is inclined relative to a fluid stream, sufficient contact is achieved between the fluid stream and the semiconductor photocatalyst, thereby removing pollutants efficiently.

(2) When a plurality of porous filter plates are three-dimensionally assembled such that each filter plate is inclined relative to an activating light, sufficient irradiation of the activating light on the photocatalytic surface and enough utilization of scattered light are ensured.

Thus, the first three-dimensional, photocatalytic filter apparatus according to the present invention comprises a plurality of porous filter plates each carrying a photocatalyst for decomposing pollutants in a fluid stream which comes into contact with the porous filter plates, the porous filter plates being arranged in a path of the fluid stream such that each porous filter plate is inclined relative to both the fluid stream and a light source, to achieve sufficient contact with the pollutants and sufficient exposure to the light source.

The flow path means is preferably constituted by a pair of parallel, transparent sheets such as transparent glass or plastics, with the light source disposed outside at least one of the parallel, transparent sheets.

Each porous filter plate is preferably inclined by 15–75° relative to the fluid stream and by 15–75° relative to the light source.

The porous filter plates may intersect each other in a lattice pattern, such that all of the porous filter plates are inclined relative to both the fluid stream and the light source. The porous filter plates in one direction are inclined preferably by 15–75° relative to the light source, and the porous filter plates in the other direction are inclined preferably by 75–15° relative to the light source.

The second three-dimensional, photocatalytic filter apparatus according to the present invention comprises (a) a flow path means through which a fluid stream containing pollutants passes; (b) a plurality of porous filter plates each carrying a photocatalyst for decomposing the pollutants; (c) a light source; and (d) at least one support member for arranging each porous filter plate in a path of the fluid stream in the flow path means, at such a three-dimensional position that each porous filter plate is inclined relative to both the fluid stream and the light source, to achieve sufficient contact with said pollutants and sufficient exposure to the light source.

The flow path means is preferably a pipe having a longitudinal axis along which an elongated light source extends, and a plurality of the porous filter plates extend in the pipe spirally around the light source in parallel therewith, the porous filter plates being fixed to the support member such that each porous filter plate is inclined relative to both axial and radial directions of the flow path means.

All of the porous filter plates spirally extend at an angle of 15–75° relative to the axial direction of the light source and are inclined at an angle of 15–75° relative to the radial direction of the light source. The pipe is preferably made of a material reflecting an activating light emanating from the light source and has a pbotocatalyst layer on its inner surface.

The support member may be an integral, daisy wheel-shaped member having an annular frame and a plurality Of radially inclined petal portions projecting from the annular frame, each of the inclined petal portions having a slit or groove for supporting an end of each porous filter plate. Alternatively, the support member may be disc frame having a plurality of radially inclined slits or grooves each supporting an end of each porous filter plate.

The third three dimensional, photocatalytic filter apparatus according to the present invention comprises (a) a flow path means through which a fluid stream containing pollutants passes; (b) a plurality of frustoconical, porous filter plates each carrying a photocatalyst for decomposing the pollutants; (c) an elongated light source extending along the axis of the flow path means; and (d) a support member disposed around the light source for arranging the porous filter plates longitudinally in the flow path means, whereby a conical surface of each porous filter plate is inclined relative to both the fluid stream the said light source, to achieve sufficient contact with the pollutants and sufficient exposure to the light source.

The flow path means is preferably a pipe having a longitudinal axis along which the elongated light source extends. A conical surface of each porous filter plate is inclined by 15–75° relative to the axial direction of the light source and by 15–75° relative to the radial direction of the light source.

The fourth three-dimensional, photocatalytic filter apparatus according to the present invention comprises (a) a flow path means through which a fluid stream containing pollutants passes; (b) a corrugated porous filter plate carrying a photocatalyst for decomposing pollutants and disposed in the flow path means; and (c) a light source disposed outside at least one of said flow path means, whereby the corrugated porous filter plate is inclined relative to both the fluid stream and the light source, to achieve sufficient contact with the pollutants and sufficient exposure to the light source.

The fifth three-dimensional, photocatalytic filter apparatus according to the present invention comprises (a) a flow path means through which a fluid stream containing pollutants passes; (b) a spiral porous filter plate carrying a photocatalyst for decomposing the pollutants; (c) an elongated light source extending along the axis of the flow path means; and (d) a support member disposed around the light source for arranging the spiral porous filter plate longitudinally in the flow path means, whereby a surface of the spiral porous filter plate is inclined relative to both the fluid stream and the light source, to achieve sufficient contact with the pollutants and sufficient exposure to the light source.

A surface of the spiral porous filter plate is inclined by 15–75° relative to the axial direction of the light source and by 15–75° relative to the radial direction of the light source.

In any of the above three-dimensional, photocatalytic filter apparatuses, each porous filter plate is preferably constituted by a porous substrate, a porous layer of fine particles deposited on at least one surface of the porous substrate and a photocatalyst layer deposited on a surface of the porous layer. The porous substrate and/or the porous layer is preferably made of a metal selected from the group consisting of Fe, Al, Ti, Cu and their alloys, particularly stainless steel. The porous substrate is preferably constituted by a net or mesh of metal wires or a perforated metal sheet.

DETAILED DESCRIPTION OF THE PREFERRED EMBODIMENTS

[1] Porous filter plate

A porous filter plate for the three-dimensional, photocatalytic filter apparatus of the present invention is constituted by a porous substrate, a porous layer composed of fine particles fixed onto at least one surface of the porous substrate, and a photocatalyst layer deposited on the surface of the porous layer.

(A) Porous substrate

Figure 1A:
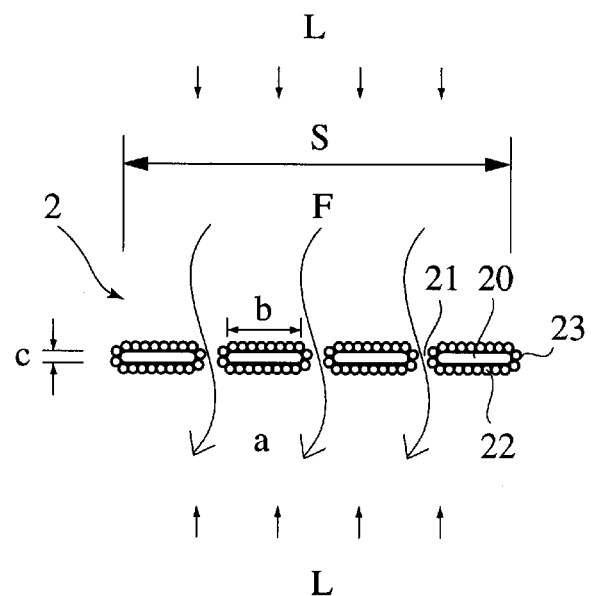
FIG. 1(a) is a schematic, partial, cross-sectional view showing one example of a porous filter plate comprising a porous substrate -and a porous layer according to the present invention.

As shown in FIGS. 1(a) and (b), a porous substrate 20 of each filter plate 2 has a lot of pores 21 through which a fluid (gas or liquid) containing pollutants passes. Fine particles 22 are deposited onto a surface of the porous substrate 20 to form a porous layer 23 to such an extent that the pores 21 are sufficiently covered by the porous layer 23 of fine particles 22.

Figure 1B:
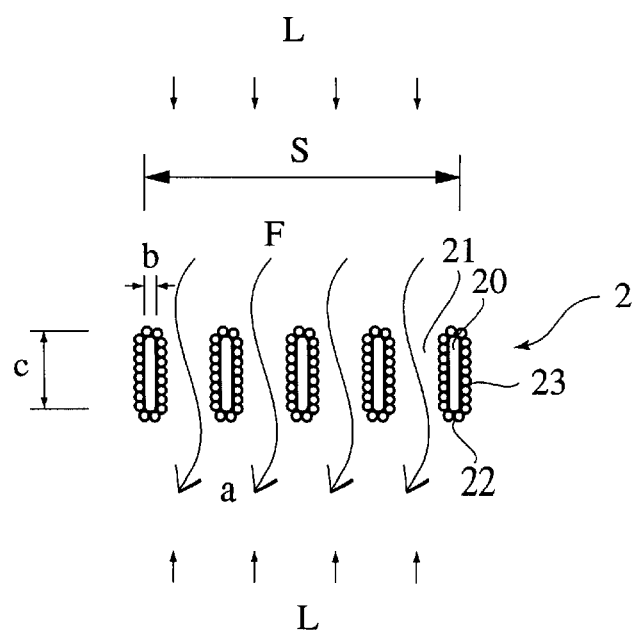
FIG. 1(b) is a schematic, partial, cross-sectional view showing another example of a porous filter plate comprising a porous substrate and a porous layer according to the present invention.

In FIGS. 1(a) and (b), "S" represents a surface area of a region of the porous substrate 20 that is exposed to an activating light, "a" represents the amount of a fluid stream F passing through the porous substrate 20 per a unit time, "b" represents a surface area of a region of the porous layer 23 between adjacent pores 21, and "c" represents a surface area of the side of the porous substrate 20. It is preferred that the flow rate "a" of the fluid stream F is maximum, and that the porous substrate 20 has such a structure as to provide a maximum ratio of b/S and a minimum ratio of c/S. Accordingly, the structure shown in FIG. 1(a) is more preferable than that shown in FIG. 1(b).

The porous substrate 20 may be constituted by a net or mesh of wires, a perforated sheet, etc. In this case, the wire and the perforated sheet are preferably made of metals such as Fe or its alloys such as austenitic stainless steel (SUS304, SUS310, SUS316, etc.); Al or its alloys such as Al—Si—Mg alloy; Ti or its alloys such as Ti—Mn alloy and Ti—Cr alloy; and Cu or its alloys. When Fe or Fe alloy is used for the porous substrate 20, a non-oxydizing film such as iron oxide is preferably formed on a surface of the porous substrate 20. The porous substrate 20 may also be constituted by a porous ceramic, glass, metal or plastic sheet.

(B) Porous layer

The porous layer 23 is formed on a surface of the porous substrate 20 to increase a surface area thereof. The porous layer 23 may be composed of fine particles 22 of ceramics, glass, metals, plastics, etc. The fine particles 22 are preferably Fe or its alloys such austenitic stainless steel (SUS304, SUS310, SUS316, etc.); Al or its alloys such as Al—Si—Mg alloy; Ti or its alloys such as Ti—Mn alloy and Ti—Cr alloy; and Cu or its alloys. The materials for the fine particles 22 are preferably the same as those of the porous substrate 20

Fine particles having extremely small sizes are expensive, while those having too large sizes fail to provide the porous layer 23 with a sufficient surface area. Accordingly, the average diameter of the fine particles 22 is preferably 10–400 $\mu$m. The shapes of the fine particles 22 are not restricted, and they may have regular shapes such as sphere or irregular shapes with sharp edges. The fine particles 22 may also be flaky.

To integrally fuse the fine particles 22 to the porous substrate 20, the fine particles 22 and the porous substrate 20 are preferably made of the same metals. When different materials are used, it is preferable to use suitable binders to securely adhere the fine particles 22 to the porous substrate 20. In this case, the different materials are preferably combined such that their linear thermal expansion coefficients are substantially equal or near to each other, or one of the materials is preferably easily stretchable to absorb the thermal expansion of the other material. The binder may be inorganic glass, frit, metal powder, thermoplastic resins, etc.

The porous layer 23 may be formed on the porous substrate 20 by applying a slurry of fine particles 22 in a liquid medium such as water, alcohol or a mixture thereof (solid content: 60–80 weight %) to a surface of the porous substrate 20, drying the resultant coating, and sintering the fine particles 22.

The fine particles 22 are preferably applied onto the porous substrate 20 by dipping, spraying, screen-printing, etc. The application of the fine particles 22 may be carried out several times.

The sintering temperature of the fine particles 22 may be selected depending on a material thereof. When the sintering temperature is too low, the resultant porous layer 23 does not have a sufficient sintering density, resulting in poor mechanical strength. On the other hand, when the sintering temperature is equal to or higher than the melting point of the fine particles 22, the fine particles 22 are melted, resulting in coarse pores in the porous layer 23. Specifically, the sintering temperature is preferably 800–1000° C. for SUS, Ti alloys and Cu alloys, and 300–400° C. for aluminum alloys.

The porous layer 23 has a pore size preferably in the range of 5–1000 $\mu$m. If the pore size of the porous layer 23 were more than 1000 $\mu$m, dust would not be filtered out. When the thickness of the porous layer 23 is less than 10 $\mu$m, the porous layer 23 has insufficient mechanical strength. On the other hand, when the thickness of the porous layer 23 exceeds 100 $\mu$m, the porous layer 23 is highly resistant to a fluid flow, causing excessive pressure loss. Therefore, the thickness of the porous layer 23 is preferably 10–100 $\mu$m.

(C) Photocatalyst layer

Semiconductor photocatalysts usable in the present invention include $TiO_2$, ZnO, $SrTiO_3$, CdS, CdO, CaP, InP, $In_2O_3$, CaAs, $BaTiO_3$, $K_2NbO_3$, $Fe_2O_3$, $Ta_2O_5$, $WO_3$, $SnO_2$, $Bi_2O_3$, NiO, $Cu_2O$, SiC, $SiO_2$, $MoS_2$, $MoS_3$, InPb, $RuO_2$, $CeO_2$, etc. Most preferable among them is anatase-type $TiO_2$ because of low cost, high stability and harmlessness to human body.

The semiconductor photocatalyst may be coated on the porous layer 23 by spraying, dipping, etc. of a sol of a semiconductor photocatalyst such as $TiO_2$. After coating and drying, the semiconductor photocatalyst is securely bound to the fine particles 22 by baling preferably at 50–500° C.

When the semiconductor photocatalyst sol contains amorphous titanium peroxide or oxide at a dry weight ratio of 1:1 to 1:5 on the basis of a titanium element to the semiconductor photocatalyst, the semiconductor photocatalyst is securely deposited on the fine particles 22 at relatively low temperatures. Further, small amounts of Pt, Ag, Rh, $RuO_2$, Nb, Cu, Sn, NiO, etc. may be added to provide antibacterial properties and mildew resistance to the resultant photocatalyst layer. Also, to enhance the photocatalytic oxidative/reductive decomposition of pollutants in the fluid stream F, inorganic substances such as zeolite, silica, alumina, zinc oxide, magnesium oxide, rutile-type titanium oxide, zirconium phosphate, etc., activated carbon, porous phenol resins, and porous melamine resins may be added.

A primer layer may preferably be formed on the porous layer 23 by spraying a hydrosol of titanium peroxide, etc.

before forming the semiconductor photocatalyst layer on the fine particles 22. The titanium peroxide primer layer provides the fine particles 22 with enough wettability, so that the semiconductor photocatalyst sol is evenly distributed on the fine particles 22.

The titanium peroxide primer layer is also effective for the porous substrate 20 and the fine particles 22 both made of a metal such as stainless steel, because they are made well wettable with the semiconductor photocatalyst sol. Titanium peroxide also serves as a binder. Since titanium peroxide contains no ceramic components, it has high affinity for a metal, ensuring the semiconductor photocatalyst to securely adhere to the fine metal particles 22 via titanium peroxide. As a result, the photocatalyst would not be detached from the porous layer 23, even when the filter plate 2 is deflected or vibrated.

(D) Application of porous filter plate

The porous filter plate may be formed in various shapes depending on its use, and it may be curved or twisted, if necessary. In one embodiment, the photocatalyst layer may be formed on both sides of the porous substrate 20. In this case, light sources are preferably placed on both sides of the porous filter plate 2 so that both surfaces of the porous filter plates 2 are irradiated at the same time.

Because of the porous substrate 20, the porous filter plate 2 may serve not only as a filter element but also as a porous partition. For example, the porous filter plate 2 may be utilized for cleaning the air in a closed chamber or room. When a part of inner wall of a closed chamber of a refrigerator, etc. is formed with a porous, photocatalytic filter plate, and when the air is circulated in the closed chamber through the porous filter plate, undesirable substances such as ethylene, which ages vegetables and fruits, and smell substances such as hydrogen sulfide, mercaptan, etc. can be removed from the air. Since the inner wall serves as a filter, no additional filter is needed, permitting the maximum use of an internal space of the chamber.

In addition to the fluid-cleaning functions, the porous, photocatalytic filter plate exhibits a sound-absorbing function, a vision-shielding function, a defoaming function, and a wave-absorbing function.

When the porous photocatalytic filter plate is used as a sound barrier between a sidewalk and a roadway, the sound-absorbing effect is obtained in addition to the photocatalytic decomposition of pollutants such as $NO_x$ and $SO_x$ in the air. The traffic noise is reduced because the propagation energy of sound wave is absorbed by the porous, photocatalytic filter plate while passing through the complicated porous structure thereof. The photocatalytic filter exhibiting the shielding effect may be used as a blind, a partition, etc.

A turbulent or uneven liquid stream brings pollutants to uneven contact with the porous, photocatalytic filter plate 2. However, the liquid stream passing through the porous, photocatalytic filter plate 2 ensures uniform contact of pollutants with the photocatalyst. Bubbles on a surface of a liquid stream may cover the photocatalytic surface, preventing enough contact between the pollutants and the photocatalytic surface. As the liquid stream penetrates into the porous, photocatalytic filter plate 2, bubbles are divided to finer ones or disappear due to the complicated porous structure of the filter plate 2, thereby preventing the photocatalytic surface from being covered by the bubbles.

The porous filter plate 2 may also be used as a filter for an air-conditioning system, a filter for a waste gas-treating apparatus, a building component such as wallboard, a wall material for algae-free aquarium and swimming pool, etc.

[2] Three-dimensional, photocatalytic filter apparatus

Figure 2:
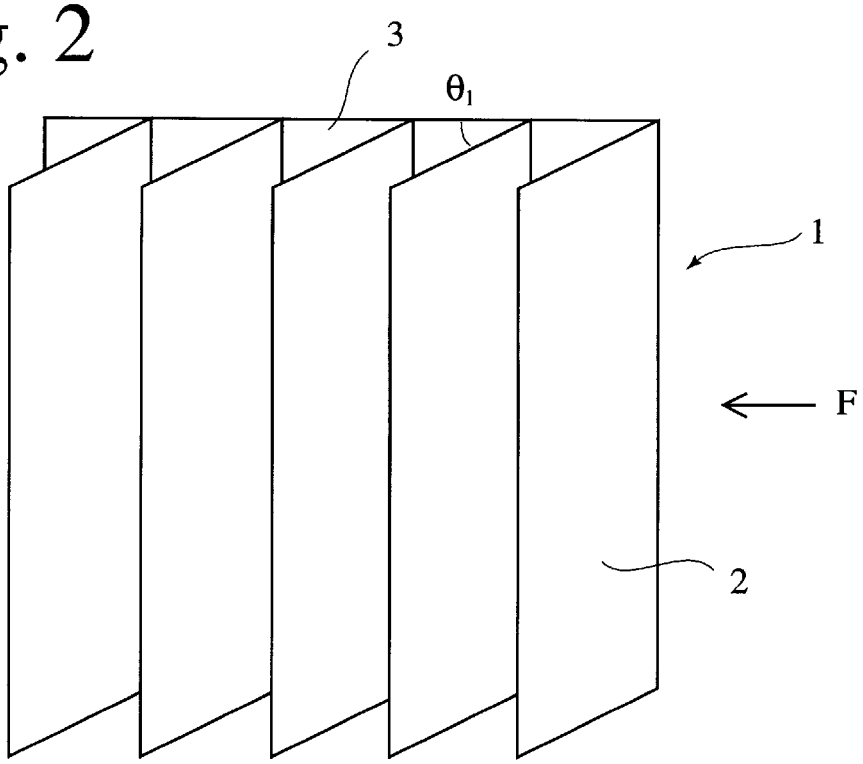
FIG. 2 is a schematic perspective view showing a three-dimensional, photocatalytic filter apparatus according to one embodiment of the present invention.
Figure 3:
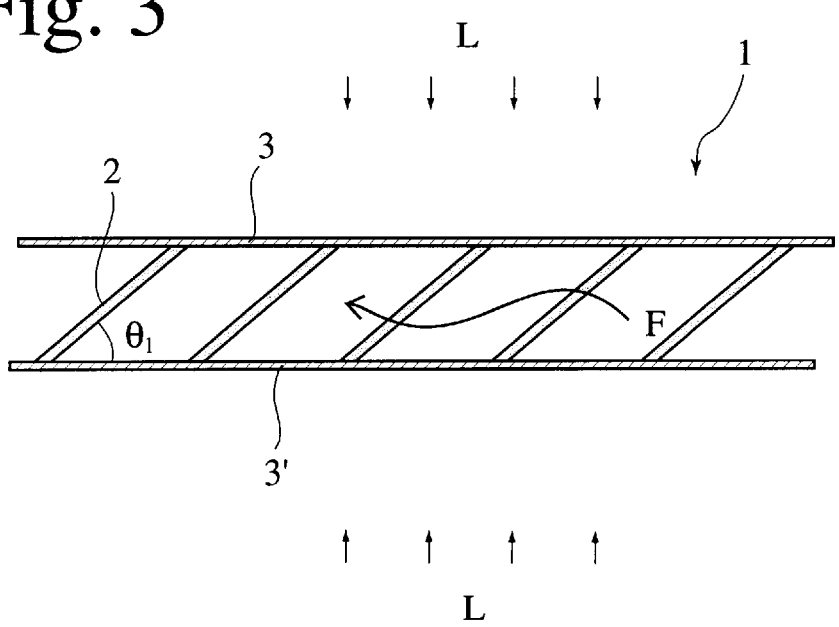
FIG. 3 is a cross-sectional view showing the same three-dimensional, photocatalytic filter apparatus as in FIG. 2.

In one embodiment shown in FIGS. 2 and 3, the three-dimensional, photocatalytic filter apparatus 1 comprises a plurality of porous filter plates 2 inclined in the same direction at an angle of $\theta_1$ relative to the direction of the fluid stream F and arranged at a regular interval in a longitudinal direction, and flow path means 3, 3' for defining a flow path of the fluid stream F. Both ends of each porous filter plate 2 are supported by support members (not shown). The fluid stream F flows through a plurality of the inclined porous filter plates 2. Light sources are positioned on both sides of the flow path means 3, 3' such that both surfaces of each porous filter plate 2 is exposed to an activating light L. The flow path means 3, 3' are preferably made of transparent sheets such as transparent glass or plastics. The inclination angle $\theta_1$ is preferably 15–75°, more preferably 30–60°, and particularly 45°.

Figure 4:
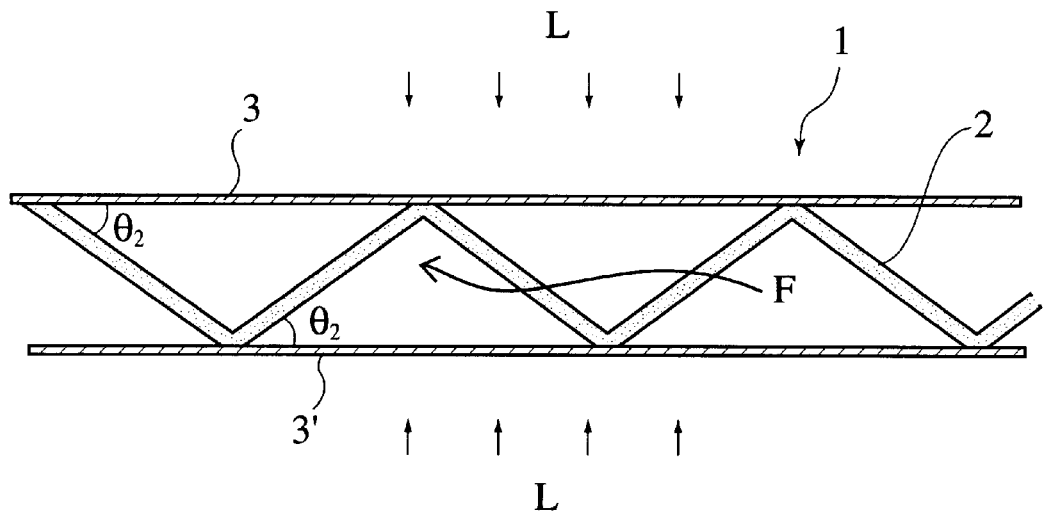
FIG. 4 is a cross-sectional view showing a three-dimensional, photocatalytic filter apparatus according to another embodiment of the present invention.

In another embodiment shown in FIG. 4, a porous filter plate 2 is corrugated at an angle of $\theta_2$ relative to the direction of the fluid stream F, and light sources are placed on both sides of transparent flow path means 3, 3'. The corrugating angle $\theta_2$ is preferably 15–75°, more preferably 30–6020, and particularly 45°.

Figure 5:
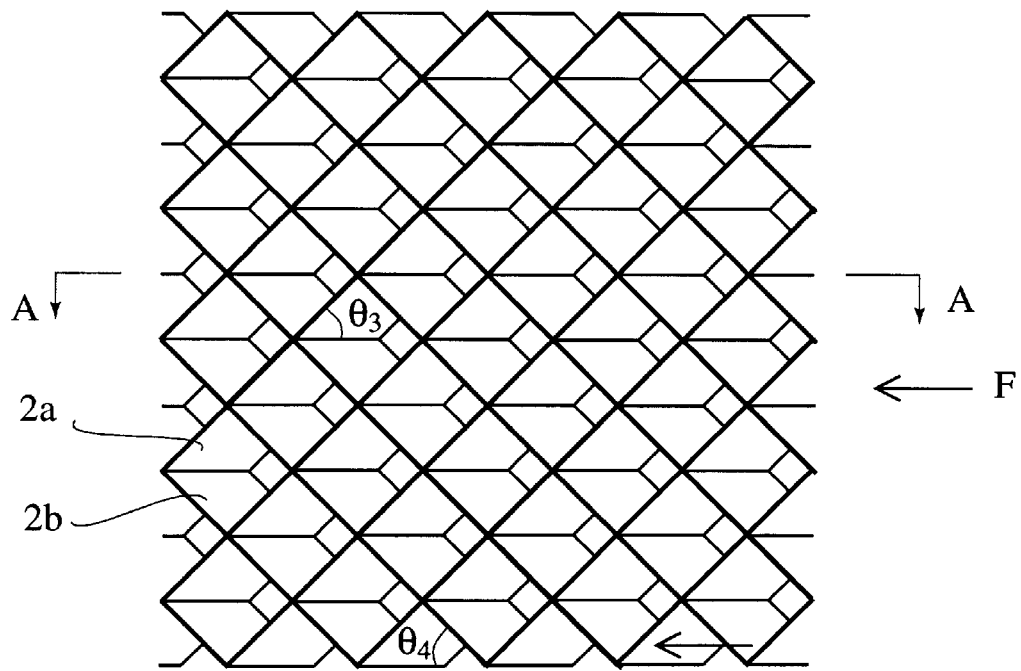
FIG. 5(a) is a front view showing a three-dimensional, photocatalytic filter apparatus according to a further embodiment of the present invention.
FIG. 5(b) is a cross-sectional view taken along the line A—A in FIG. 5(a)
Figure 5:
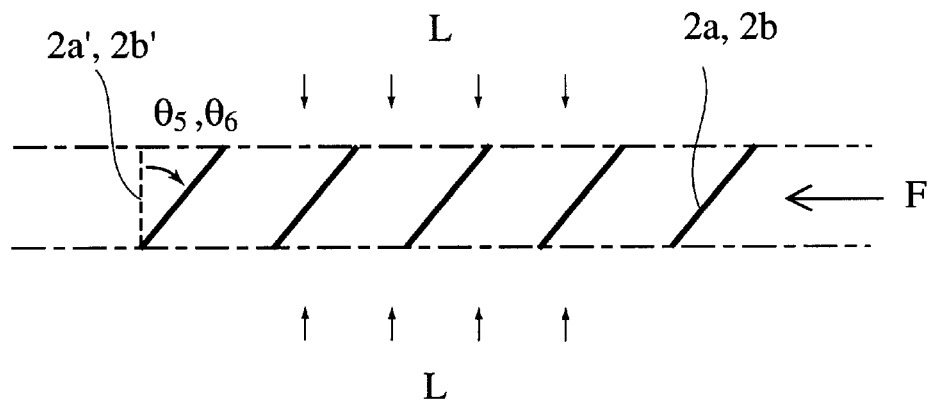

A three-dimensional, photocatalytic filter apparatus shown in FIGS. 5(a) and (b) has a honeycomb structure constituted by two groups of porous filter plates 2a, 2b. Each porous filter plate 2a in one group is inclined by an angle $\theta_3$ relative to the fluid stream F (see FIG. 5(a)), and rotated around its axis by an angle $\theta_5$ (see FIG. 5(b)). Likewise, each porous filter plate 2b in the other group is inclined in the opposite direction by an angle $\theta_4$ relative to the fluid stream F (see FIG. 5(a)), and rotated around its axis by an angle $\theta_6$ (see FIG. 5(b)). In FIG. 5(b), a dotted line 2a', 2b' indicates a hypothetical position of each porous filter plate when there is no rotation around its axis.

Figure 6:
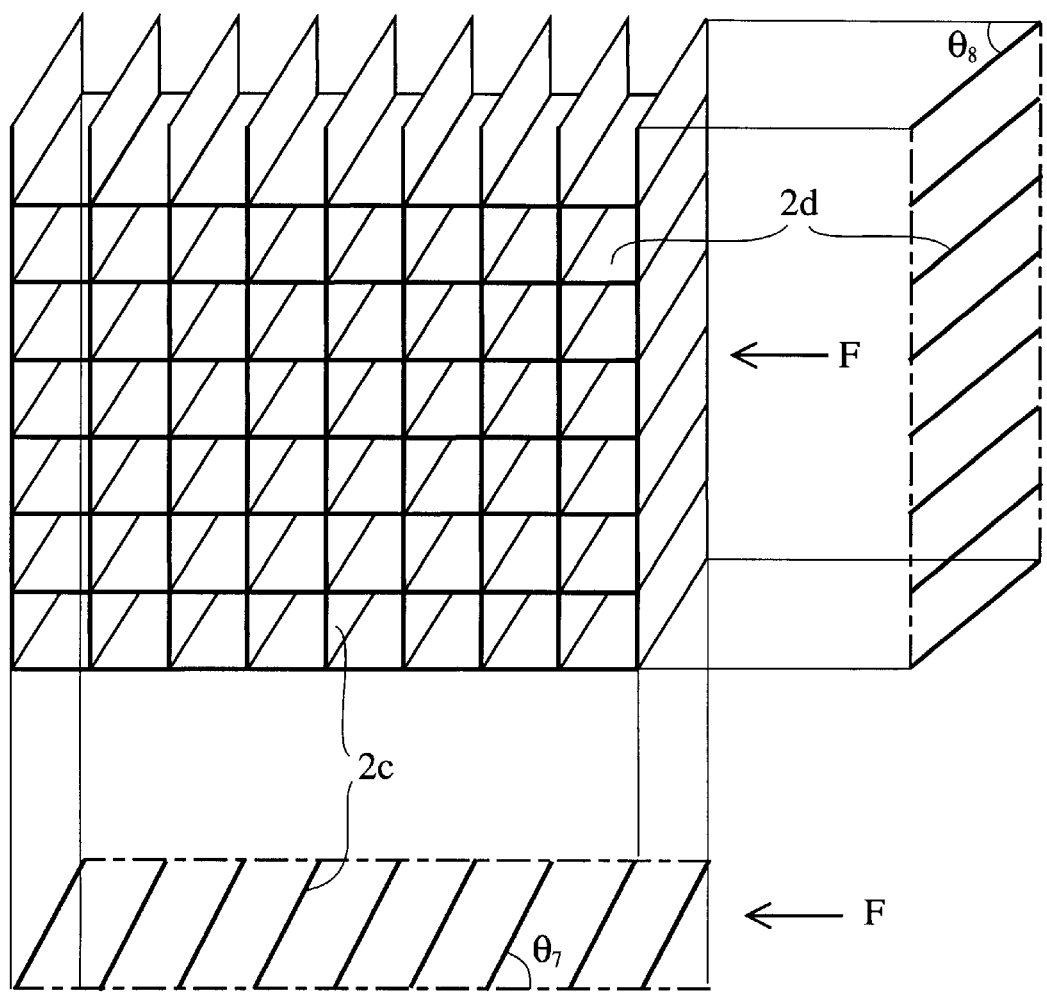
FIG. 6 is a front view together with a plan view and a side view each showing a three-dimensional, photocatalytic filter apparatus according to a still further embodiment of the present invention.

Each of the inclination angles $\theta_3$ and $\theta_4$ is preferably 15–75°, more preferably 30–60°, and particularly 45°. Also, each of the rotation angles $\theta_5$ and $\theta_6$ is preferably 15–75°, more preferably 30–60°, and particularly 45°, With such arrangement of the porous filter plates 2a, 2b, both surfaces of each porous filter plate 2a, 2b are sufficiently exposed to an activating light FIG. 6 shows a three-dimensional, photocatalytic filter apparatus according to a further embodiment having two groups of porous filter plates 2c, 2d assembled in a lattice structure. Light sources (not shown) are disposed on both sides of the porous filter plates 2c, 2d. The porous filter plates 2c in one group extend vertically and are rotated around their axes by an angle $\theta_7$. The porous filter plates 2d in the other group extend horizontally and are rotated around their axes by an angle $\theta_8$. Each of the rotation angles $\theta_7$ and $\theta_8$ is preferably 15–75°, more preferably 30–60°, and particularly 45°. Thus, both of the porous filter plates 2c, 2d are sufficiently exposed to an activating light.

Figure 7:
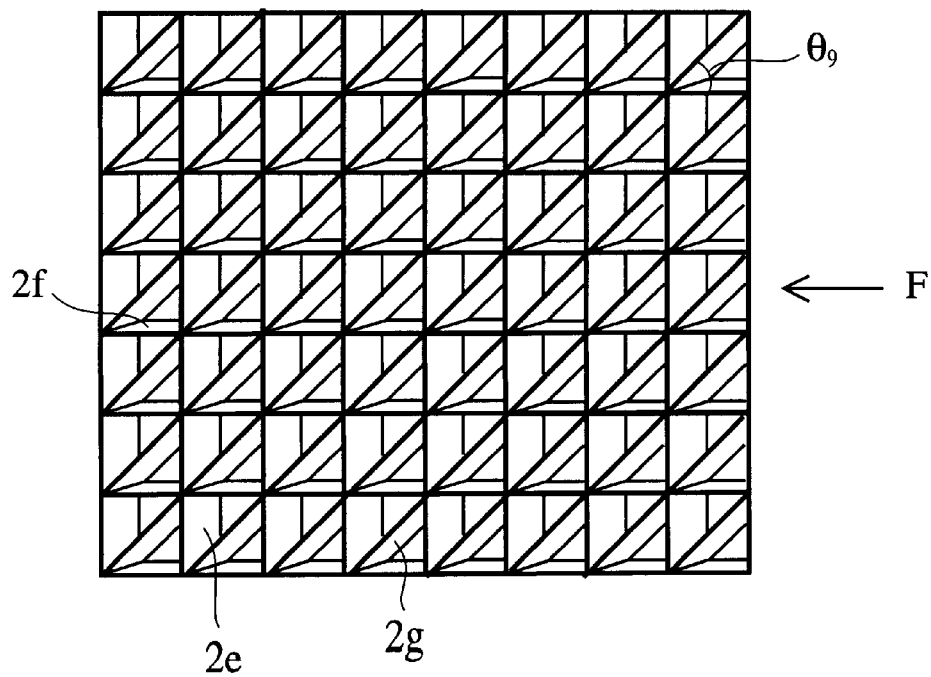
FIG. 7 is a front view showing a three-dimensional, photocatalytic filter apparatus according to a still further embodiment of the present invention.

FIG. 7 shows a three dimensional, photocatalytic filter apparatus according to a still further embodiment having three groups of porous filter plates 2e, 2f, 2g; porous filter plates 2e, 2f being assembled in a lattice structure, and oblique porous filter plates 2g crossing the porous filter plates 2e, 2f. Light sources (not shown) are disposed on both sides of the porous filter plates 2e, 2f, 2g. As is clear from FIG. 7, all of the porous filter plates 2e, 2f, 2g are inclined relative to the fluid stream F and an activating light (not shown). The inclination angle $\theta_9$ of the oblique porous filter plates 2g is typically 45°. Thus, all of the porous filter plates 2e, 2f, 2g are sufficiently exposed to an activating light.

Figure 8:
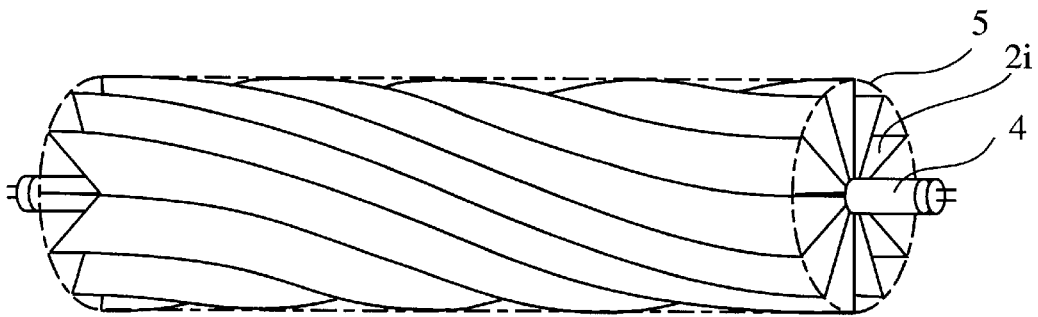
FIG. 8 is a side view showing a three-dimensional, photocatalytic filter apparatus according to a still further embodiment of the present invention.

FIG. 8 schematically shows a three-dimensional, photocatalytic filter apparatus according to a still further embodiment having a plurality of porous filter plates 2i arranged around a light source 4 and spirally extending along the axis of the light source 4. The porous filter plates 2i are contained in a cylindrical pipe 5. Each porous filter plate 2i is inclined by an angle of 30°, for example, relative to the radial direction of the light source 4 (the activating light direction).

Figure 9:
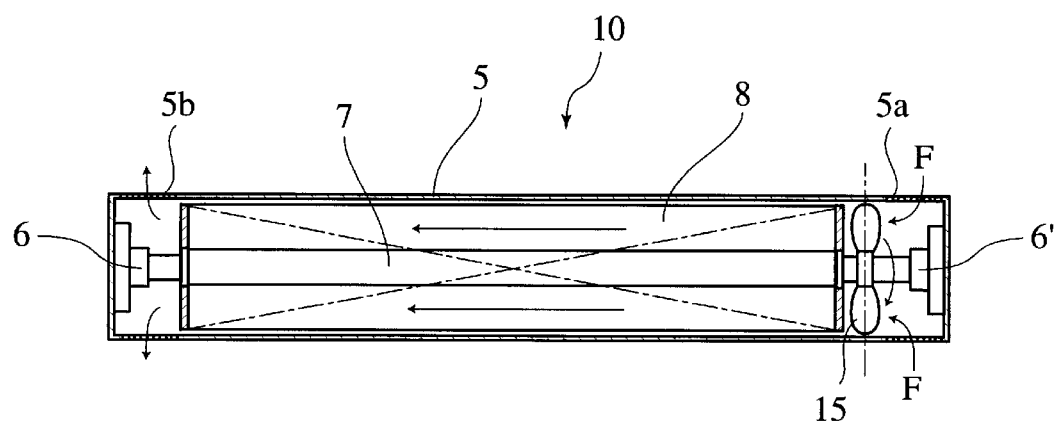
FIG. 9 is a cross-sectional view showing a three-dimensional, photocatalytic filter apparatus according to a still further embodiment of the present invention.
Figure 10:
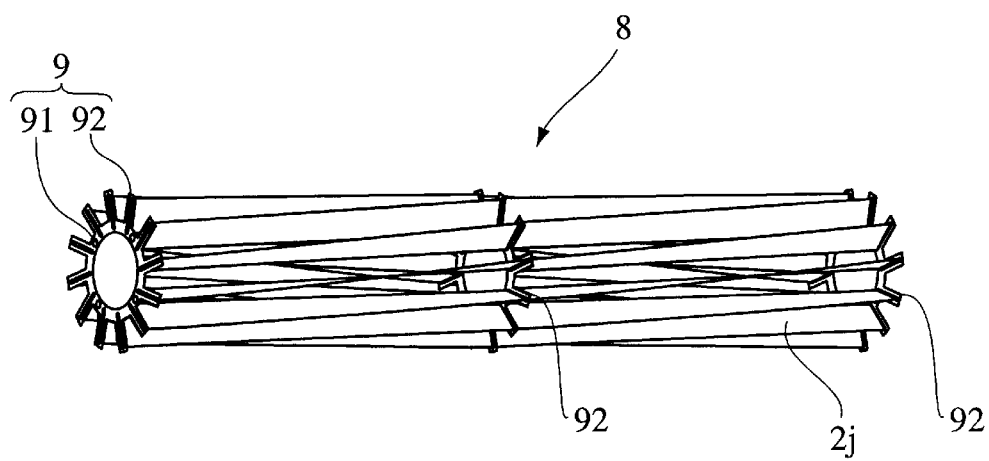
FIG. 10 is a perspective view showing a three-dimensional, photocatalytic filter element in the three-dimensional, photocatalytic filter apparatus of FIG. 9.
Figure 11:
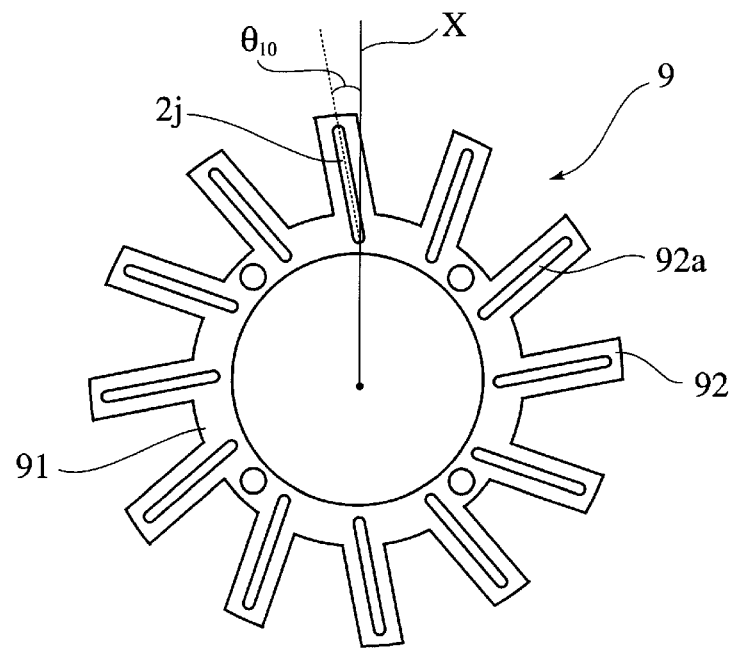
FIG. 11 is a front view showing one type of a support member in the three-dimensional, photocatalytic filter element of FIG. 10.
Figure 12:
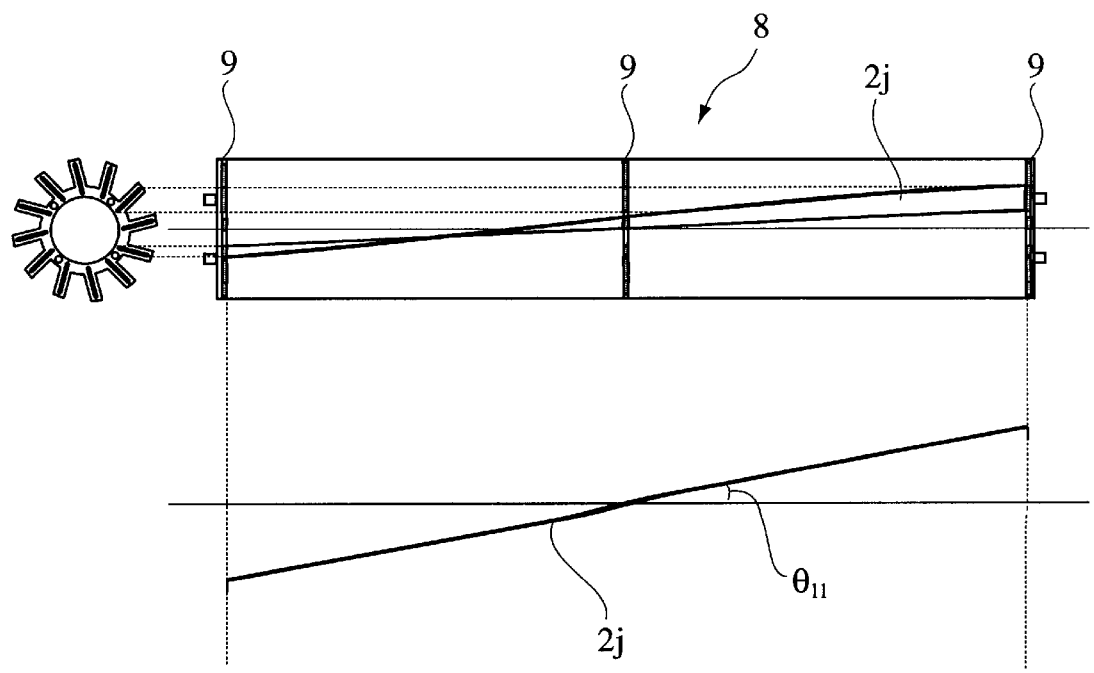
FIG. 12 is a schematic view showing the structure of the three-dimensional, photocatalytic filter unit of FIG. 10.

FIG. 9 shows a three-dimensional, photocatalytic filter apparatus 10 according to a still further embodiment, and FIG. 10 shows a photocatalytic filter unit 8 contained in the three-dimensional, photocatalytic filter apparatus 10 of FIG. 9. FIG. 11 shows a support member 9 contained in the photocatalytic filter unit 8 of FIG. 10, and FIG. 12 schematically shows the inclination of porous filter plates 2j in the photocatalytic filter unit 8.

Referring to FIG. 9, the three-dimensional, photocatalytic filter apparatus 10 comprises a cylindrical pipe 5 having an inlet 5a and an outlet 5b for a fluid stream F, a light source 7 positioned at a center of the cylindrical pipe 5, and a three-dimensional, photocatalytic filter unit 8 disposed between the cylindrical pipe 5 and the light source 7. Both ends of the light source 7 are supported by sockets 6, 6' fixed to the cylindrical pipe 5. The light source 7 may be a lamp having a wavelength of 360–390 nm, such as a black light, a fluorescent light, etc. A fan 15 is mounted inside the cylindrical pipe 5 upstream of the three-dimensional, photocatalytic filter unit 8 to generate a fluid stream F.

The cylindrical pipe 5 is preferably made of a material reflecting an activating light irradiated from the light source 7. In the case of a near ultraviolet light source, the cylindrical pipe 5 is preferably made of an Al alloy, stainless steel, etc. An inner surface of the cylindrical pipe S is preferably coated with a photocatalyst layer to increase decomposition efficiency. The cylindrical pipe 5 preferably has a window through which an activating light passes.

Referring to FIG. 10, the three-dimensional, photocatalytic filter unit 8 is constituted by three daisy wheel-shaped, support members 9 and a plurality of porous filter plates 2j supported by the support members 9. The porous filter plates 2j spirally extend along the axis of the light source 7 with inclination relative to the radial direction of the light source 7.

Each support member 9 is constituted by an annular frame 91 and a plurality of petal portions 92 projecting from the annular frame 91. Each petal portion 92 is inclined by an angle of $\theta_{10}$ relative to the radial direction X of the light source 7. Each petal portion 92 has a radial groove or slit 92a for receiving an end of each porous filter plate 2j.

The radial inclination angle $\theta_{10}$ is preferably determined such that the maximum exposure of each porous filter plate 2j to the light source 7 is achieved. The maximum radial inclination angle $\theta_{10}$ can geometrically be determined by the number of the porous filter plates 2j and the width (radial length) of each porous filter plate 2j. A typical radial inclination angle $\theta_{10}$ is about 30° for 12 porous filter plates 2j.

Referring to FIG. 12, the larger the longitudinal inclination angle $\theta_{11}$ of each porous filter plate 2j, the likelier the fluid stream F comes to contact with the pbotocatalyst layer of each porous filter plate 2j.

However, too large longitudinal inclination angle $\theta_{11}$ makes the working of the porous filter plates 2j difficult. For example, the longitudinal inclination angle $\theta_{11}$ is preferably 15–45° for 12 porous filter plates 2j.

In the three-dimensional, photocatalytic filter apparatus shown in FIGS. 9–12, a fluid stream F containing pollutants such as an waste water are introduced into the cylindrical pipe 5 through an inlet 5a and forced by a fan 15 to flow longitudinally through the cylindrical pipe 5 along the porous filter plates 2j. While flowing through the porous filter plates 2j, pollutants are decomposed by a photocatalytic reaction with the photocatalyst on the porous filter plates 2j activated by an activating light from the light source 7. Because each porous filter plate 2j is inclined relative to the light source 7, ultraviolet rays can uniformly and fully irradiate the photocatalyst layer, thereby ensuring the uniform activation of the semiconductor photocatalyst. The cleaned fluid stream F is then discharged from the filter apparatus through an outlet 5b.

Figure 13:
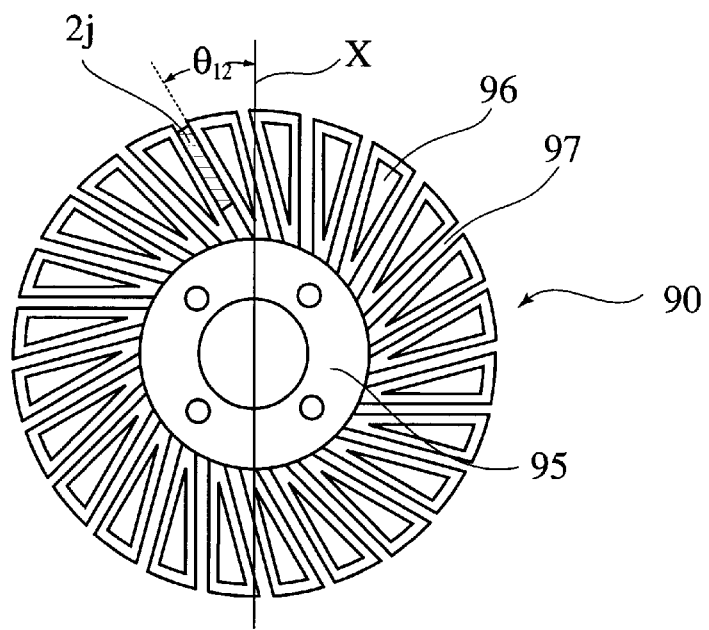
FIG. 13 is a front view showing another type of a support member for a three-dimensional, photocatalytic filter unit.

FIG. 13 shows another support member 90. The support member 90 comprises a disc frame 95, and a plurality of radial projections 96 with a gap 97 between adjacent radial projections 96. An end of the porous filter plate 2j is supported by each gap 97. In this example, the support member 90 has 24 gaps 97 for supporting 24 porous filter plates 2j.

Figure 14:
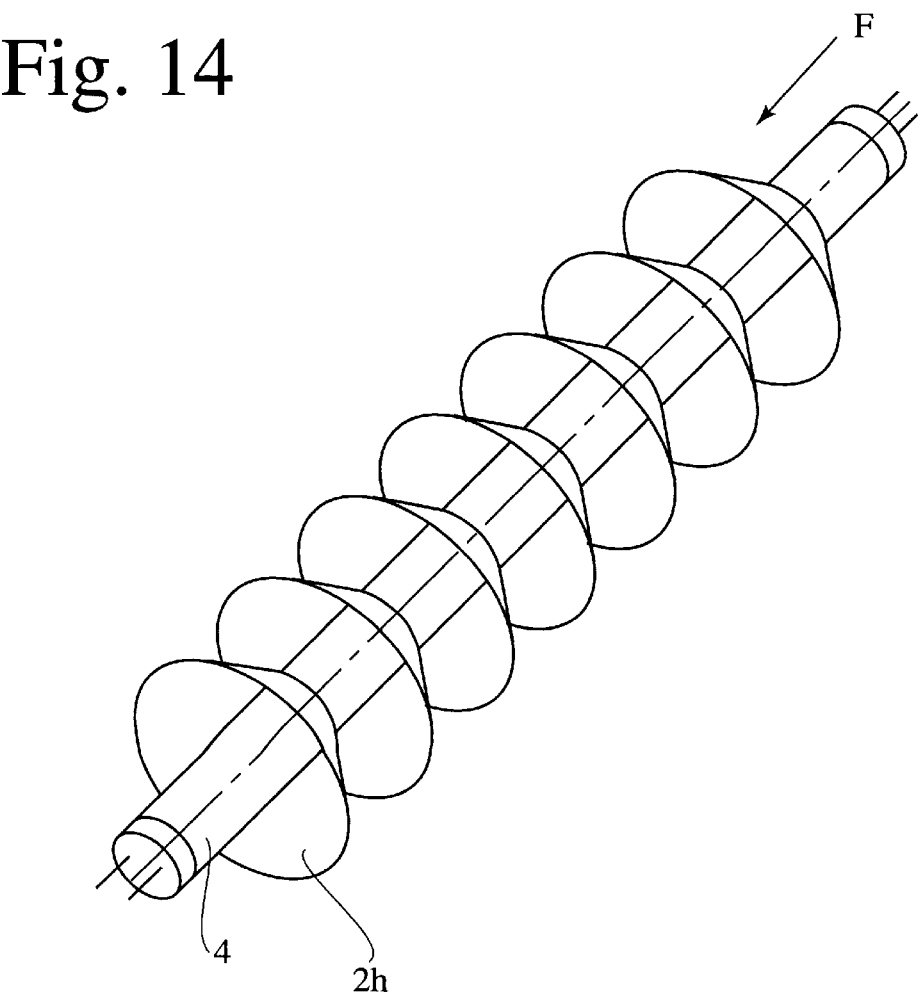
FIG. 14 is a perspective view showing a three-dimensional, photocatalytic filter apparatus according to a still further embodiment of the present invention.

FIG. 14 shows a three-dimensional, photocatalytic filter apparatus comprising a plurality of frustoconical filter plates 2h arranged around a light source 4 and supported by support members (not shown). The photocatalytic surface of each frustoconical filter plate 2h is inclined relative to the fluid stream F by an angle of preferably 15–75°, more preferably 30–60°, particularly 45°.

Figure 15:
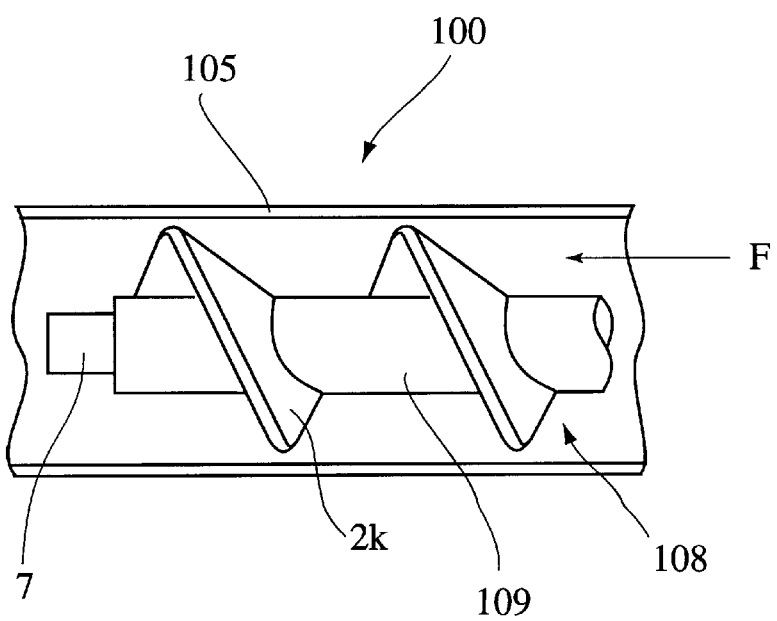
FIG. 15 is a partial, cross-sectional view showing a three-dimensional, photocatalytic filter apparatus according to a still further embodiment of the present invention.

FIG. 15 shows a three-dimensional, photocatalytic filter apparatus 100 having a three-dimensional, photocatalytic filter unit 108 comprising a plurality of spiral porous filter plates 2k fixed to a support member 109 disposed around a light source 7. The spiral porous filter plates 2k are inclined relative to the fluid stream F and an activating light emitted from the light source 7 both by an angle of preferably 15–75°, more preferably 30–60°, particularly 45°.

In any three-dimensional, photocatalytic filter apparatus of the present invention, when pollutants such as nitrogen compounds, sulfur compounds, chlorine compounds, etc. are decomposed by the photocatalyst carried by the porous filter plate, intermediate products formed during their decomposition reaction tend to attach to the surface of the semiconductor photocatalyst. Because the intermediate products should be removed regularly, the three-dimensional, photocatalytic filter apparatus should have a structure permitting easy cleaning of the porous filter plates to maintain their decomposition capacity. Thus, the three-dimensional, photocatalytic filter apparatus preferably has such a structure that water, weak acidic water, etc. can easily be injected to remove the intermediate products. In one example, the three-dimensional, photocatalytic filter unit is taken out of the cylindrical pipe and washed with water, weak acidic water, etc.

The three-dimensional, photocatalytic filter apparatus of the present invention has been described specifically referring to the drawings attached hereto. It should be noted, however, that the drawings attached hereto illustrate preferred embodiments of the present invention without intention of restricting the scope of the present invention thereto, and that any modifications may be added to the three-dimensional, photocatalytic filter apparatus unless deviating from the spirit of the present invention. For instance, when the above-mentioned, three-dimensional, photocatalytic filter apparatus is used, it may be stationary or under vibration or rotation.

As described above in detail, the porous, photocatalytic filter plate carries a semiconductor photocatalyst on a porous layer formed on a porous substrate, the filter plate has a large photocatalytic surface area, ensuring enough contact with pollutants in the fluid steam. Also, because the three-dimensional, photocatalytic filter apparatus of the present invention comprises at least one porous, photocatalytic filter carrying a semiconductor photocatalyst on a porous layer formed on a porous substrate it is brought into sufficient contact with pollutants in a fluid stream, exhibiting high efficiency in decomposing pollutants in the fluid stream. With a plurality of porous filter plates arranged such that each of them is inclined relative to both the fluid stream and the light source, an activating light and scattered light thereof can fully be used to activate the semiconductor photocatalyst on the porous filter plate. The three-dimensional, photocatalytic filter apparatus may preferably have such a structure as to easily permit intermediate products attached to the porous filter plates to be removed.

What is claimed is:

1. A three-dimensional, photocatalytic filter apparatus comprising a plurality of porous filter plates each carrying a photocatalyst for decomposing pollutants in a fluid stream which comes into contact with said porous filter plates, said porous filter plates being arranged in a path of said fluid stream defined by a flow path means such that each porous filter plate is inclined relative to both said fluid stream and a light source, to achieve sufficient contact with said pollutants and sufficient exposure to said light source, wherein said flow path means is constituted by a pair of parallel, transparent sheets, and said light source is disposed outside at least one of said parallel, transparent sheets, and each of said porous filter plates is inclined by 15–75° relative to said fluid stream and by 15–75° relative to said light source.

2. The three-dimensional, photocatalytic filter apparatus according to claim 1, wherein each of said porous filter plates is constituted by a porous substrate, a porous layer of fine particles deposited on at least one surface of said porous substrate and a photocatalyst layer deposited on a surface of said porous layer.

3. The three dimensional, photocatalytic filter apparatus according to claim 1, wherein said porous substrate and/or said porous layer is made of a meted from the group consisting of Fe, Al, Ti, Cu and their alloys.

4. The three-dimensional, photocatalytic filter apparatus according to claim 3, wherein said porous substrate and/or said porous layer is made of stainless steel.

5. The three-dimensional, photocatalytic filter apparatus according to claim 1, wherein said porous substrate is constituted by a net or mesh of metal wires or a perforated metal sheet.

6. A three dimensional, photocatalytic filter apparatus comprising a plurality of porous filter plates each carrying a photocatalyst for decomposing pollutants in a fluid stream which comes into contact with said porous filter plates, said porous filter plates being arranged in a path of said fluid stream defined by a flow path means such that each porous filter plate is inclined relative to both said fluid stream and a light source, to achieve sufficient contact with said pollutants and sufficient exposure to said light source, wherein said flow path means is constituted by a pair of parallel, transparent sheets, and said light source is disposed outside at least one of said parallel, transparent sheets, and each of said porous filter plates is inclined by 15–75° relative to said fluid stream and by 15–75° relative to said light source, said porous filter plates further intersecting each other in a lattice pattern such that all of said porous filter plates are inclined relative to both said fluid stream and said light source, to achieve sufficient contact with said pollutants and sufficient exposure to said light source.

7. The three-dimensional, photocatalytic filter apparatus according to claim 6, wherein said porous filter plates in one direction are inclined by 15–75° relative to said light source, and said porous filter plates in the other direction are inclined by 75–15° relative to said light source.

* * * * *